Nov. 8, 1932.    A. GONSALVES    1,886,478
AEROPLANE CONSTRUCTION
Filed Nov. 17, 1931
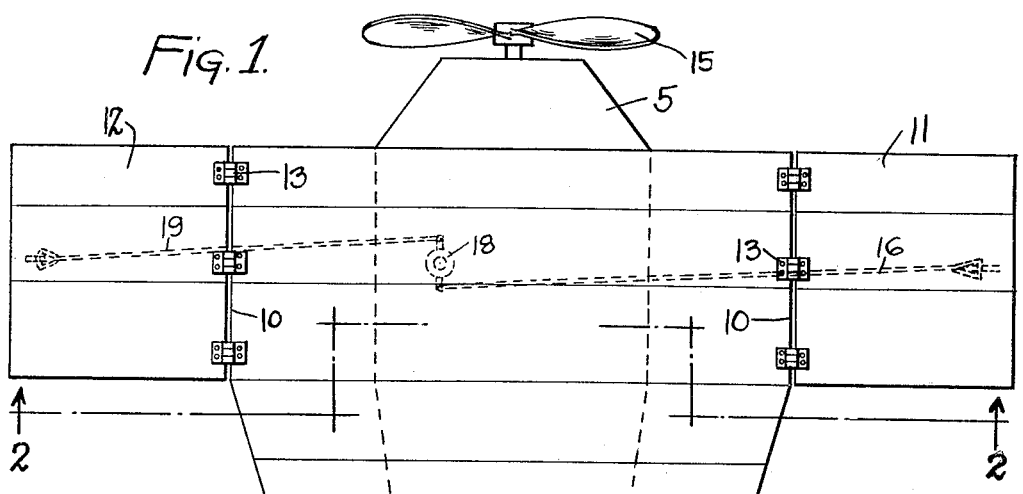
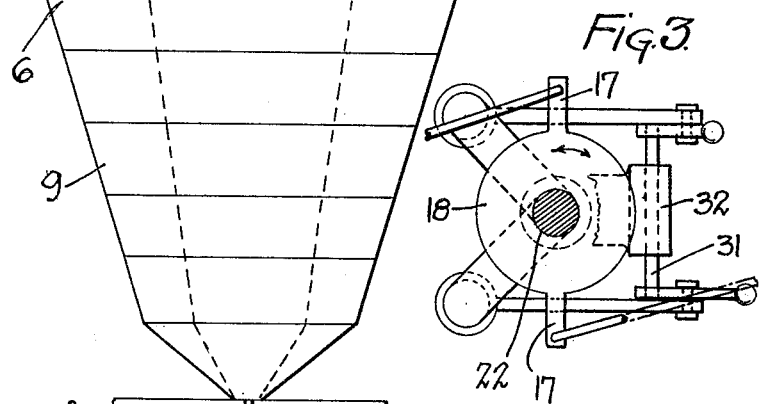
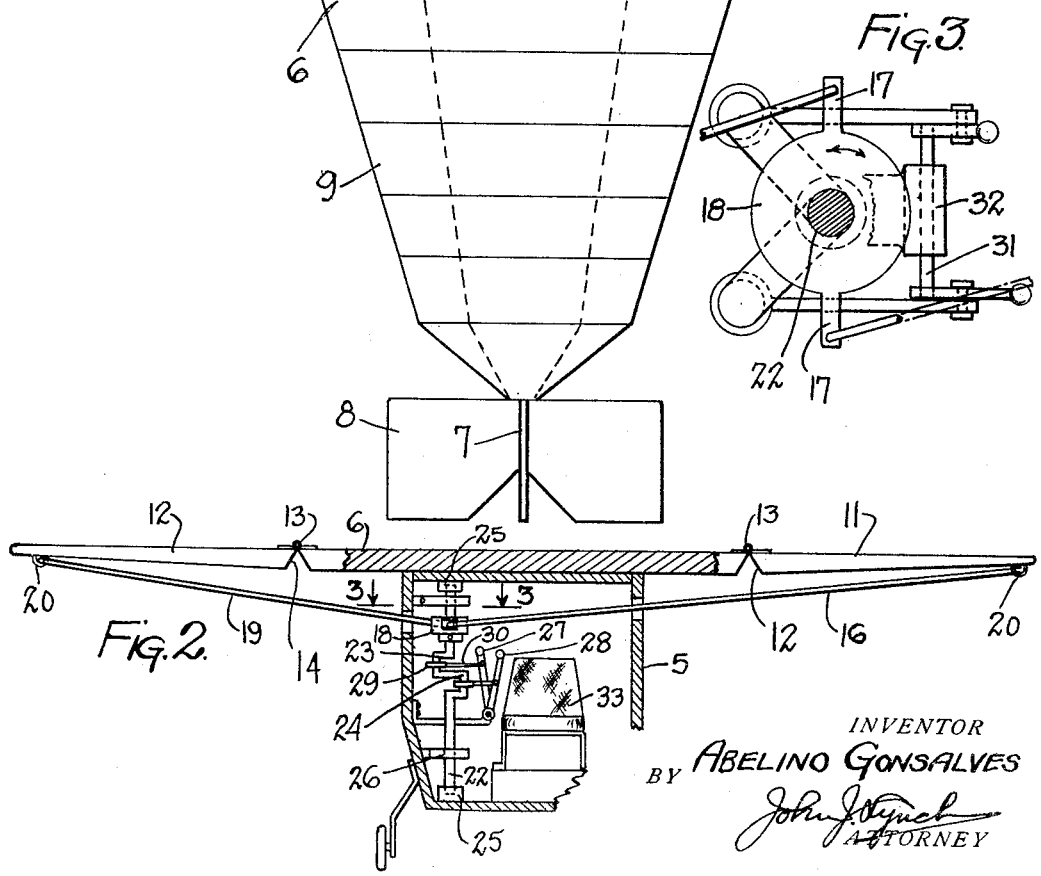
INVENTOR
ABELINO GONSALVES
BY John J. Lynch
ATTORNEY Patented Nov. 8, 1932

1,886,478

UNITED STATES PATENT OFFICE

ABELINO GONSALVES, OF NEWARK, NEW JERSEY, ASSIGNOR OF ONE-HALF TO JOSE GONSALES ALVASES, OF NEWARK, NEW JERSEY

AEROPLANE CONSTRUCTION

Application filed November 17, 1931. Serial No. 575,506.

This invention relates to aeroplanes and in particular to an auxiliary wing construction which is arranged for sustaining aeroplane after the motor has ceased to function.

A particular object of my invention is to provide an aircraft with auxiliary wings which are made to flap in simulation of a bird's wings in flight so that the apparatus will be sustained in the air and will not crash when the motor ceases to function.

A particular object of my invention is to provide an apparatus of the character referred to which is operable by hand from the pilot seat of the craft so that in an emergency, the device may be immediately accessible and operable to prevent a crash, the flapping of the wings occurring with such rapidity that the air thereunder buoys up the craft and prevents its crashing to earth.

A still further object of my invention is to provide in an aircraft, a unitary wing construction which extends from side to side of the plane and substantially the length thereof so that the flapping of the wings will build up beneath the extended solid wing portion of the plane, sufficient air pressure to buoy up the craft and prevent its falling too rapidly, thus avoiding serious damage.

A still further object of my invention is to provide an auxiliary wing construction for an aeroplane which while not operable for the purpose of propelling the aircraft, will stop it from falling in a dive or spin, as the various angular positions that can be assumed by the auxiliary wings are such that flight in a downward direction is prevented that usually occurs in a dive or spin and the flapping of the wings set up air pressures that ease the craft to the ground.

Changes and variations may be made in the construction shown and described without departing from the principles of the invention or sacrificing its chief advantages; hence such invention is not to be confined to the structures shown in the accompanying drawing; in which, Figure 1 is a plan view of an aircraft constructed in accordance with my invention, the auxiliary wings being illustrated as hinged to the main wing and the operating connection of said auxiliary wings to the actuating apparatus being illustrated.

Figure 2 is a section taken on the line 2—2 of Figure 1, showing the arrangement of the part and means for operating the auxiliary wing, and Figure 3 is an enlarged section taken on the line 3—3 of Figure 2, showing the arrangement of the offset crank shaft which is operable to cause a flapping motion of the wings simultaneously.

Referring to the drawing in detail, 5 indicates the usual aircraft body having mounted at the top thereof, the unitary wing structure 6 which extends rearwardly to a point adjacent the rudder 7 from a point near the tip end of the front of the craft. The ailerons are denoted by the numeral 8 and the ailerons and rudders are operated in the usual manner from the point of control within the craft. The unitary wing structure 6 is provided with the tapered side 9 and the parallel edges 10 through the latter of which are secured, the auxiliary wings 11 and 12 through the medium of the hinges 13 which are suitably secured as by rivets or otherwise to the wing 6 and the auxiliary wing.

The under edges of the meeting edges of the auxiliary wings and the main wing are cut back as at 14 to provide for the pivotal movement of the wings 11 and 12 relatively to the fixed wing 6. The auxiliary wings 11 and 12 are normally in the plane of the main wing 6 and during the operation of the propellor 15 through the medium of a suitable motor, not shown, the entire wing structure including the main wing 6 and the auxiliary wings are used to sustain the craft in the air, no operation of the auxiliary wings taking place.

When the motor, however, ceases to function and drive the propeller 15, then use is made of the auxiliary wings 11 and 12 to provide a flapping motion which will sustain the craft in the air and permit it to land without considerable damage. In order to carry out this flapping operation of the wings 11 and 12, I connect the wing 11 through the medium of the wing rod 16 with one of the extensions 17 of an operating disk 18, the wing 12 being also operated by a similar rod 19 which is secured to the opposite extension 17 of the disk 18. These rods 16 and 19 pass out through suitable openings in the side of the aeroplane body 5 and through the medium of suitable eyes 20 are secured to the under side of the auxiliary wings 11 and 12, adjacent the outer edges of said wing and centrally thereof.

The disk 18 is connected in any suitable manner to the vertical shaft 22 which is provided with the offset crank portions 23 and 24, the shaft 22 being journalled in the bearings 25 disposed at the bottom and top of the aeroplane cabin 5, the shaft being further supported in its vertical position through the medium of the brackets 26 secured to the side wall of the cabin 5 in any suitable manner.

The offset portions 23 and 24 of the shaft 22 are connected respectively with the handles 27 and 28 through the medium of the collars 29 and links 30. Both of the handles 27 and 28 are pivoted to the shaft 31 which is journalled in the bracket 32 secured to the side wall of the cabin 5 in any suitable manner.

The seat for the pilot indicated by the numeral 33 is adjacent the handles 27 and 28 so that when the motor fails, the pilot may simply turn to the handles 27 and 28 and actuate them alternately back and forth in treadle fashion to reciprocate the shaft 22 through an arc of substantially 90 degrees so that the rods 16 and 19 actuating the auxiliary wings 11 and 12 respectively, will move the wings up and down on their hinges 13 to provide a flapping motion, which as before noted, will assist in supporting the aircraft after the propeller 15 has stopped operating and will prevent accidental crashing.

It is evident, therefore, that I have provided a simplified aeroplane construction comprising the auxiliary wings secured to a main wing which function as a part of the plane when the propeller is operating and which function in addition to prevent falling of the plane when the motor ceases to operate by providing a flapping motion which will build up air pressure beneath the main wing to support the plane.

My invention is not to be restricted to the precise details of construction shown since various changes and modifications may be made therein without departing from the scope of the invention or sacrificing the advantages derived from its use.

What I claim is:—

In an aeroplane, a body, a main wing on the body, auxiliary wings hinged to said main wing, means in the body operable to impart a flapping movement to said auxiliary wings, said means including a vertical shaft having offset portions therein, a collar on the shaft, extensions on the collar, a wing operating rod connecting each extension with an auxiliary wing, handles, and connections between said handles and offset shaft portions whereby the shaft may be revolvably reciprocated.

In testimony whereof I affix my signature.

ABELINO GONSALVES. [L. S.]